(12) United States Patent
Clark

(10) Patent No.: US 8,190,279 B2
(45) Date of Patent: May 29, 2012

(54) PRODUCTION LINE MANAGEMENT SYSTEM

(75) Inventor: Lee M. Clark, Ewing, NJ (US)

(73) Assignee: Systech International, Cranbury, NJ (US)

( * ) Notice: Subject to any disclaimer, the term of this patent is extended or adjusted under 35 U.S.C. 154(b) by 322 days.

(21) Appl. No.: 12/590,670

(22) Filed: Nov. 12, 2009

(65) Prior Publication Data

US 2011/0112685 A1    May 12, 2011

(51) Int. Cl.
*G06F 19/00* (2011.01)
*G05B 19/42* (2006.01)

(52) U.S. Cl. ............... 700/96; 700/86; 700/87; 700/95; 700/97

(58) Field of Classification Search .................. 700/112, 700/115–116, 214–215, 219, 221, 227–229, 700/17, 86–87, 95–97; 382/306
See application file for complete search history.

(56) References Cited

U.S. PATENT DOCUMENTS

| | | | |
|---|---|---|---|
| 6,944,521 B2 * | 9/2005 | Yoshida et al. | 700/169 |
| 7,516,084 B1 * | 4/2009 | Sankaran et al. | 705/7.31 |
| 7,570,165 B2 * | 8/2009 | Abraham et al. | 340/572.1 |
| 7,698,013 B2 * | 4/2010 | Honda et al. | 700/116 |
| 2003/0139936 A1 * | 7/2003 | Saucier et al. | 705/1 |
| 2005/0102052 A1 * | 5/2005 | Yoshida et al. | 700/117 |
| 2006/0212164 A1 * | 9/2006 | Abraham et al. | 700/215 |
| 2007/0219663 A1 * | 9/2007 | Verstraeten | 700/215 |
| 2008/0027578 A1 * | 1/2008 | Honda et al. | 700/228 |
| 2009/0224923 A1 * | 9/2009 | Abraham et al. | 340/572.1 |
| 2009/0319318 A1 * | 12/2009 | Estefania et al. | 705/7 |
| 2010/0287879 A1 * | 11/2010 | Donati et al. | 53/52 |
| 2011/0112982 A1 * | 5/2011 | Srinivasan et al. | 705/348 |

FOREIGN PATENT DOCUMENTS

WO    WO 2009-083595    9/2009

* cited by examiner

*Primary Examiner* — Ramesh Patel
(74) *Attorney, Agent, or Firm* — Drinker, Biddle & Reath, LLP

(57) ABSTRACT

An apparatus, system and method for line management. The apparatus, system and method includes data indicative of a plurality of items to pass through the line, a plurality of available processes, and a plurality of available streams. Ones of the plurality of available processes are corresponded to obtain at least one outcome. Computing code, when executed by at least one computing processor, effects a presentation of at least one graphical user interface, wherein the at least one outcome is obtained in accordance with at least one input to the graphical user interface related to ones of the items, ones of the processes, and ones of the streams, and wherein the presentation of the at least one graphical user interface optionally comprises a remote presentation via at least one network.

16 Claims, 12 Drawing Sheets

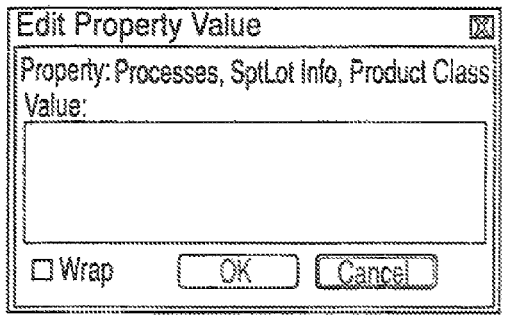

FIG. 4

| ICON | DESCRIPTION |
|---|---|
| ⊞ | THE OPERATION HAS NO INPUT OR OUTPUT STREAMS AND IS NOT EXPANDED |
| ⊟ | THE OPERATION HAS NO INPUT OR OUTPUT STREAMS AND IS EXPANDED |
| a✓ | THE PROPERTY CAN BE EDITED |
| ○ | THE SINGLE INPUT STREAM IS SET TO "(START)". THE SINGLE OUTPUT STREAM IS SET TO "(END)" |
| ∪ | THE SINGLE INPUT STREAM IS CONNECTED TO THE LINE ABOVE IT. THE SINGLE OUTPUT STREAM IS SET TO "(END)" |
| ⌣ | THE OPERATION HAS MORE THAN A SINGLE INPUT STREAM OR THE SINGLE INPUT STREAM IS NOT CONNECTED TO THE OPERATION ABOVE IT. THE SINGLE OUTPUT STREAM IS SET TO "(END)". |
| ∩ | THE SINGLE INPUT STREAM IS SET TO "(START)". THE SINGLE OUTPUT STREAM IS CONNECTED TO THE LINE BELOW IT. |
| ∥ | THE SINGLE INPUT STREAM IS CONNECTED TO THE LINE ABOVE IT. THE SINGLE OUTPUT STREAM IS CONNECTED TO THE LINE BELOW IT. |
| ⋎ | THE OPERATION HAS MORE THAN A SINGLE INPUT STREAM OR THE SINGLE INPUT STREAM IS NOT CONNECTED TO THE OPERATION ABOVE IT. THE SINGLE OUTPUT STREAM IS CONNECTED TO THE LINE BELOW IT. |
| ⌒ | THE SINGLE INPUT STREAM IS SET TO "(START)". THE OPERATION HAS MORE THAN A SINGLE OUTPUT STREAM OR THE SINGLE OUTPUT STREAM IS NOT CONNECTED TO THE OPERATION BELOW IT. |
| ⌄ | THE SINGLE INPUT STREAM IS CONNECTED TO THE LINE ABOVE IT. THE OPERATION HAS MORE THAN A SINGLE OUTPUT STREAM OR THE SINGLE OUTPUT STREAM IS NOT CONNECTED TO THE OPERATION BELOW IT. |
| ⋈ | THE OPERATION HAS MORE THAN A SINGLE INPUT STREAM OR THE SINGLE INPUT STREAM IS NOT CONNECTED TO THE OPERATION ABOVE IT. THE OPERATION HAS MORE THAN A SINGLE OUTPUT STREAM OR THE SINGLE OUTPUT STREAM IS NOT CONNECTED TO THE OPERATION BELOW IT. |

FIG. 5

PRODUCTION LINE MANAGEMENT SYSTEM

CROSS REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to production line design and management techniques, and labeling and tracking applications and, more particularly, to system and method for the designing and managing of production lines, including serialization and complex production processes.

2. Description of the Background

In many industries, there exists a need to overcome complex logistical hurdles associated with product distribution. Currently, products are generally produced in large unit numbers with each unit meeting specific standards as to quality and amount, for example. Information attached to such "lots" includes amount, packaging attributes, label characteristics, and label content, for example. However, new demands for individually tailored drugs, tracking of individual ingredients, bottles, or the like, for example, make previously used forms of high level logistical control at the lot, batch, or pallet level unworkable or unacceptable.

More particularly, previous production line management and design is global consistency-oriented and non-modular. For example, items in a production line are a means to the end, wherein the end is, for example, providing a number of consistent units with respect to labels, volume, safety seals, lot numbers, or the like. Organization in such a manner does not lend itself to individualized, targeted, modular, or similar processes in production lines, such as in serialization, for example. In such cases where discrete units of information regarding individual items in a line are important, the treatment in the available art attempting to establish global consistency by batch or lot, rather than individual uniqueness by unit, fails to comport with more current production line goals.

Therefore, the need exists for a system and method that provides for the design and management of complex, individual or uniqueness-targeted production line environments, including serialization and like complex production processes.

BRIEF SUMMARY OF THE INVENTION

The present invention is directed to an apparatus, system and method for the management and design of complex production processes. The apparatus, system and method may include data indicative of a plurality of items to pass through the line, a plurality of available processes, and a plurality of available streams, wherein each of the items passes through a configuration of ones of the plurality of available processes to obtain at least one outcome, and computing code that, when executed by at least one computing processor, effects a presentation of at least one graphical user interface, wherein the at least one outcome is obtained in accordance with at least one input to the graphical user interface related to ones of the items, ones of the processes, and ones of the streams, and wherein the presentation of the at least one graphical user interface optionally comprises a remote presentation via at least one network.

The present invention solves problems experienced with the prior art because it provides an apparatus, system and method that provides for the management and design of production processes, including serialization of complex production processes. Those and other advantages and benefits of the present invention will become apparent from the detailed description of the invention hereinbelow.

BRIEF DESCRIPTION OF THE SEVERAL VIEWS OF THE DRAWING

Understanding of the present invention will be facilitated by consideration of the following detailed description of the preferred embodiments of the present invention taken in conjunction with the accompanying drawings, in which like numerals refer to like parts, and wherein:

FIG. 4 is an illustration of the aspects of the present invention;

FIG. 5 is an illustration of the aspects of the present invention;

DETAILED DESCRIPTION OF THE INVENTION

Figure 1:
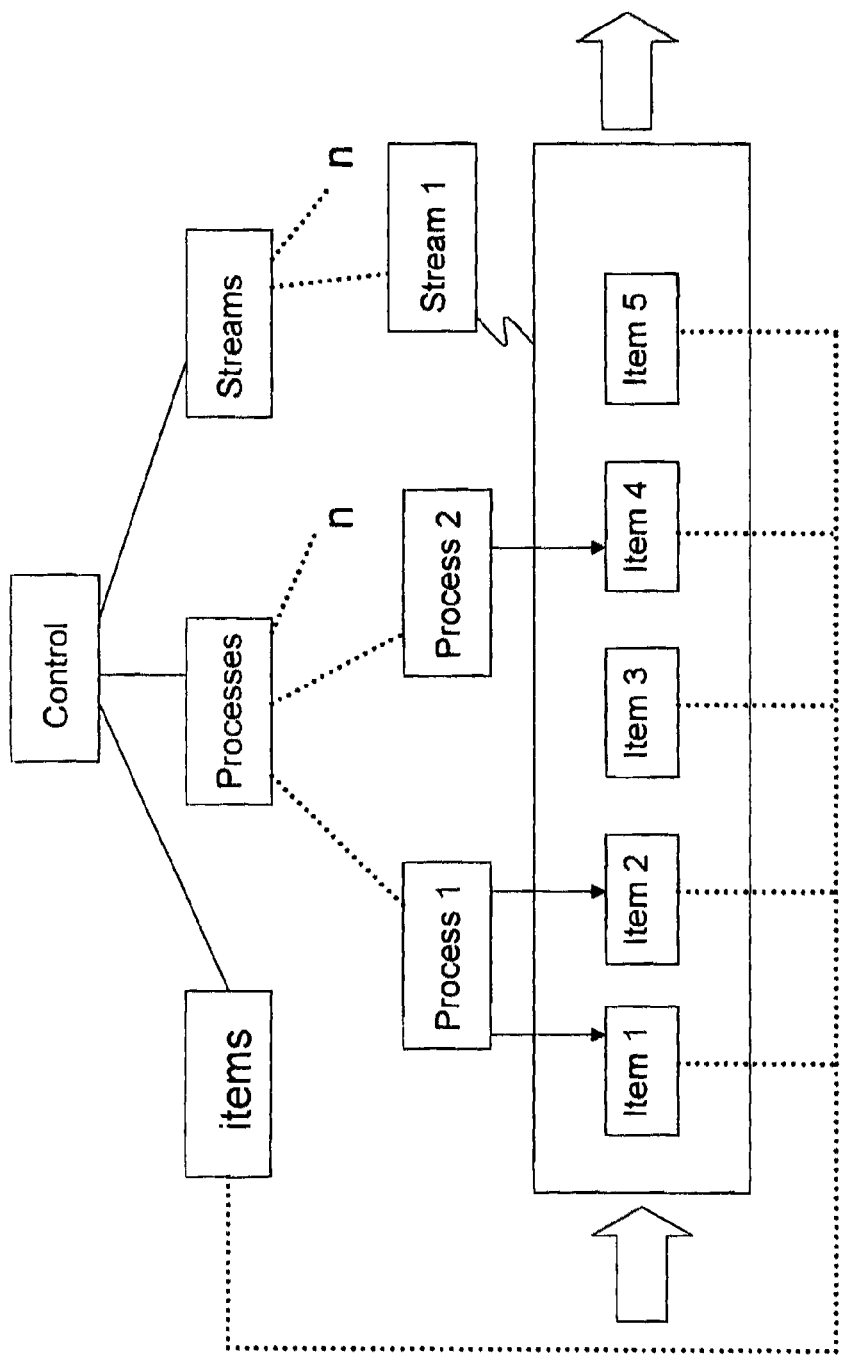
FIG. 1 is an illustration of the aspects of the present invention.

It is to be understood that the figures and descriptions of the present invention have been simplified to illustrate elements that are relevant for a clear understanding of the present invention, while eliminating, for purposes of clarity, many other elements found in typical packaging, line development and management, and label systems. Those of ordinary skill in the art will recognize that other elements are desirable and/or required in order to implement the present invention. However, because such elements are well known in the art, and because they do not facilitate a better understanding of the present invention, a discussion of such elements is not provided herein.

The present disclosures references aspects of computing software. The computing software discussed herein may be and include computing code that is compiled, executed, and/or otherwise associated with or by one or more computing microprocessors in performance of the functions, methods and outcomes discussed hereinthroughout. Further, such code may be stored on one or more computing memories, such as RAM, ROM, hard disk, or similar or related memory types. Additionally, such code may cause the presentation of one or more graphical user interfaces in performance of the functions, methods and outcomes discussed hereinthroughout. Such functions, methods and outcomes may be performed over, communicate over, and/or otherwise be associated with, one or more networks, such as a secure network or the Internet, for example. The communication with such network(s) may occur using mobile or stationary devices, and may occur via wireless and/or wired communication, for example.

The present invention may be employed to uniquely identify products and enable the tracking of those products through a supply chain, thereby minimizing diversion and counterfeiting while supporting visual inspections and I/O operations, which further supports the packaging of both serialized and non-serialized products. The present invention may provide precise, real-time inspection results using a combination of, for example, OCV, OCR, bar code, print and general quality inspections, and other techniques apparent to those skilled in the pertinent arts in light of the disclosure herein.

The present invention may also provide for production line management and may further support manual case labeling, centralized palletizing, and parent-child associations. Line management may include the commissioning and decommissioning products, the supporting of printers, barcode scanner and RFID readers operating in serialization modes, the real-time management of user defined business, real-time process and product quality checks, the generation of production and serialization reports, and the ability to run both serialized and non-serialized products on the same packaging line, for example. Typically, the performance of packaging and similar lines is managed based on a goal of global consistency across outcomes of the line. For example, a programmable logic controller (PLC) may be programmed to insure a consistent outcome of an aspect along the line for all items passing through that aspect of the line. However, such a management and design hierarchy targeted solely to global consistency does not allow for rapid deployment of process updates and/or new equipment, and makes line modifications expensive and time consuming.

Further, in accordance with this goal of global consistency, steps in a typical process for consumer packaging are not historically integrated, that is, the steps are unrelated from a management and design standpoint, excepting that each step contributes to the goal of global consistency in the outcomes of the line. This lack of integration has historically produced satisfactory outcomes for many lines, and will continue to produce satisfactory outcomes so long as the sole goal of the line is to produce all outputs to be the same. However, in the event that outputs need to be consistent, but also unique, that is, uniquely tracked, identified, and/or given a series of unique attributes, such as for serialization of outputs from the line, legacy, non-integrated line management and design tools will not continue to produce acceptable, or cost-effective, outcomes. The term "serialization" generally refers to the unique identifier used on a saleable packaging unit or handling unit. The serial number may stand alone or be associated with product information such as lot, product ID, expire date or manufacturing date.

Thus, the present invention provides an integrated line management and design system and method. The system and method are integrated at least in that they allow for unique and highly specific interrelations between and among detailed, hierarchical aspects of the system and method, and more specifically detailed aspects discussed hereinbelow as items, processes, and streams.

FIG. 1 is a conceptual block diagram illustrating an integrated, hierarchical line management and design system. The system includes a plurality of items, a plurality of processes, and at least one stream, as each of those terms is defined and discussed immediately hereinbelow, wherein ones of the plurality of items are passed through the processes along the at least one stream. The system further includes a plurality of outcomes correspondent to the plurality of items, wherein the plurality of outcomes has multiple attributes indicative of the items, processes, and streams resulting in a respective one of the outcomes. Thereby, the system provides line integration, in conjunction with globally consistent, but unique and uniquely tracked/trackable, outcomes.

An item, in accordance with FIG. 1 and as discussed hereinthroughout, is and includes any material, item, data, package, seal, machine or device (certain of which items may alternately be referred to as processes when performing operations, as discussed hereinbelow), ingredient, physical aspect, or the like that may be associated with a line, such as a packaging line. More specifically, items may indicate data to follow the physical item through a line. Items may include, for example, water used to create a solution that is ultimately solidified into another item, a pill bottle, a bar code on a pill bottle, a box of pill bottles, a bar code on a box of pill bottles, a pallet of boxes of pills bottles, a radio frequency (RF) tag associated with the pallet, a safety seal for a bottle, a pill or pills within a bottle, or the like. Items may additionally include data and data formats. Those skilled in the art will appreciate that the aforementioned list is in no way exhaustive. For example, rather than pill bottles, the subject line may include items in the form of soda bottles, tissue boxes, candy bars, EPC numbers, cases, cartons, and pallets, or any other series of items that may contribute to an ultimate outcome on a line.

A process, as used herein and in accordance with FIG. 1, is an operation performed on an item. Such operations may include a generation, a modification, a check or monitor, a machine instruction, an operation by a device, or the like. Processes may include, for example, a verification, a generation of a bar code, an application of a bar code, printing a label, a rejection, an inspection, taking of a photograph, reading of a bar code or RF tag, or the like. Likewise, processes may include data and/or database manipulations and/or operations, including a data pull or data push from a local or remote location, with regard to an item, a data compare, such as a comparison between two bar code reads at two points in a line for the same item, or the like. Processes may be performed manually or via automation and/or equipment. Those skilled in the art will appreciate that the examples of processes hereinabove are not exhaustive, and that the present disclosure encompasses any operation or process that may be performed on any item in a line of any sort.

Figure 2:
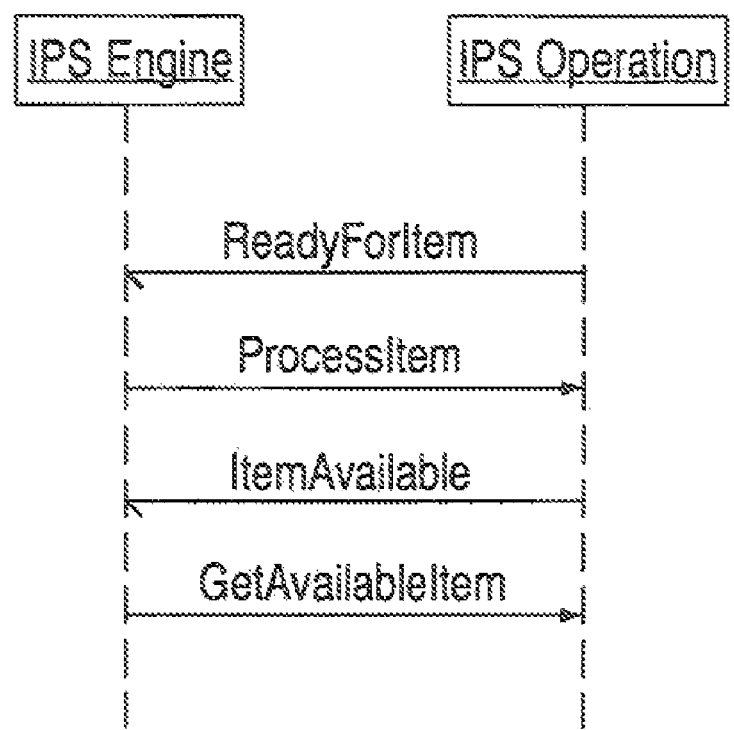
FIG. 2 is an illustration of the aspects of the present invention.

Actual processes may thus be external to the IPS system, thereby allowing modular development and expansion of process capabilities. Processes may be virtually implemented as COM objects, for example. The IPS system may run each process in its own thread, and may route the items from process to process, such as in a present sequence, only when each process has signaled its readiness, and using the stream concept discussed below. These calls for next processes are illustrated in FIG. 2. The handling of this call for the next process may be thread safe and need not be made from within the context of the process's thread.

As such, processes may be individually defined, such as being defined as a micro-task, and several micro tasks may form a composite process. For example, each of generating a bar code number, sending the number to a printer, printing a label with the correspondent number, and spinning the bar code label onto a bottle may be a micro-task, or process, and the totality of the aforementioned steps may constitute a composite process of a label placement step.

Historically, machines that perform processes have been viewed as single operations. The present invention allows a machine to be viewed as a composite process. As such, the IPS system allows for a breakdown of the composite process, thus making available simplistic change-out of machines, and/or replacement of a machine by multiple other machines, or replacement of multiple machines by a single machine. Further, improved machine directions and/or repeatable documentation may be made available to an installer or operator. The IPS system allows for the machine(s) to be modeled, installed, tested, and updated modularly, with modular change-in and change-out. Thus, a machine may be formatted as a standard module for use in any IPS system line, and can thereby be selectable from a library, for example. Further, the nature of any machine as a composite process allows for the IPS system to expose micro-tasks, or processes, within the composite, for more detailed monitoring, tracking, and design.

Within the exemplary IPS system of the present invention, composites may thus support the deployment of standard workflows by allowing the implementation of a workflow to be treated as a single entity, namely a composite. Composites may support variations in equipment, label formats, and numbering schemas without structural modifications of a standard. Thus, the allowable set of variations of a composite may be broadly defined by values of the composite. Composites may allow for alternative workflows defined single option composites, or alternative composites.

A stream, as used herein and as illustrated in FIG. 1, is a series of items moving through a series of processes to produce a plurality of outcomes from a line. As such, each item moves through a stream, and the stream is the movement of the items, and, as each item moves with the stream, it is subjected to a plurality of processes. A stream may connect an output/outcome of one process to the input of a next process.

Thereby, a stream may be hierarchically indicative of the items within the stream, and the processes through which those items move. Thus, the hierarchy may be used to model physical and data aspects of a line. Further, for example, such a hierarchy may allow a retailer, at the top level in the supply chain, to scan an item in store, and access information back to where the water for the tablet solution for the tablets in the bottle scanned came from, and when.

A stream may thus include an ordered flow of data related to items on the line, modeling the physical flow of real items. For example, the flow of labels in a labeler may physically be on a label web, and the flow of bottles may typically be via a conveyor, and stream may model each. Multiple streams may exist concurrently. Items may transfer on one or more of multiple streams, which may be synchronized to item transfers on the other streams. One stream in such an embodiment may be a master stream. The item transfer on each synchronized stream may be performed pursuant to an item transferred on the master stream. If any of the synchronized streams are not ready to transfer (i.e. either the source or destination operation is not ready) when the master stream becomes ready, a line stop error condition may be raised.

The item-process-stream (IPS) system treats each item uniquely, and allows for the addition of processes to take one or more unique actions with respect to each item. The tracking of these unique processes, and association of the tracking with each item, thus further provides uniqueness to each item. Further, the ability to track processes in order can allow for assessment of line operation and timing, such as wherein, if all items in a stream after bottle serial number 5533 have melted safety seals, the IPS system gives the knowledge of which heat seal oven overheated, and when. Thus, the IPS system allows for, for example, the monitoring of rejects, on a single line and system wide, and provides a knowledge of why rejects are occurring. This granularity provides a tool to improve operations, and produce information that allows for the tracking of yields across multiple lines, allowing for tracking of enterprise information and/or supplier information. Additionally, assessment of the stream also allows for the historic goal of global consistency among outcomes indicated by the items.

Tracking at such a granular level may allow for the discovery of otherwise undetectable errors in the line. By way of non-limiting example, an error in label placement may be assumed at first to be caused by processes related to labeling. However, such an error may instead be caused by introducing an upstream item not suitable for a particular packaging line. By reviewing, for example, predetermined threshold values, a line operator could determine that a current stock of empty bottles is of a different size than what the line is designed to use, or that, for example, the label stock being used is a different thickness and/or size. Each of these changes in values could effect the line as a whole and can be quickly identified by the current system.

In similar fashion, knowing the attributes of the items on the line, processes and functions may be changed or altered quickly. Relying on the example above, if a label of a different size is to be used in a process which had previously used another size label stock, not only can the labeling process, including the physical labeler, be modified, but each function and process affected by the size of the label may be quickly conformed. This may include, for example, the positioning of a downstream barcode reader. Similarly, a whole unit, such as an out of date labeling machine, may be replaced on the with a new machine with a different set of attributes without significant disruption to the line as a whole.

Figure 3:
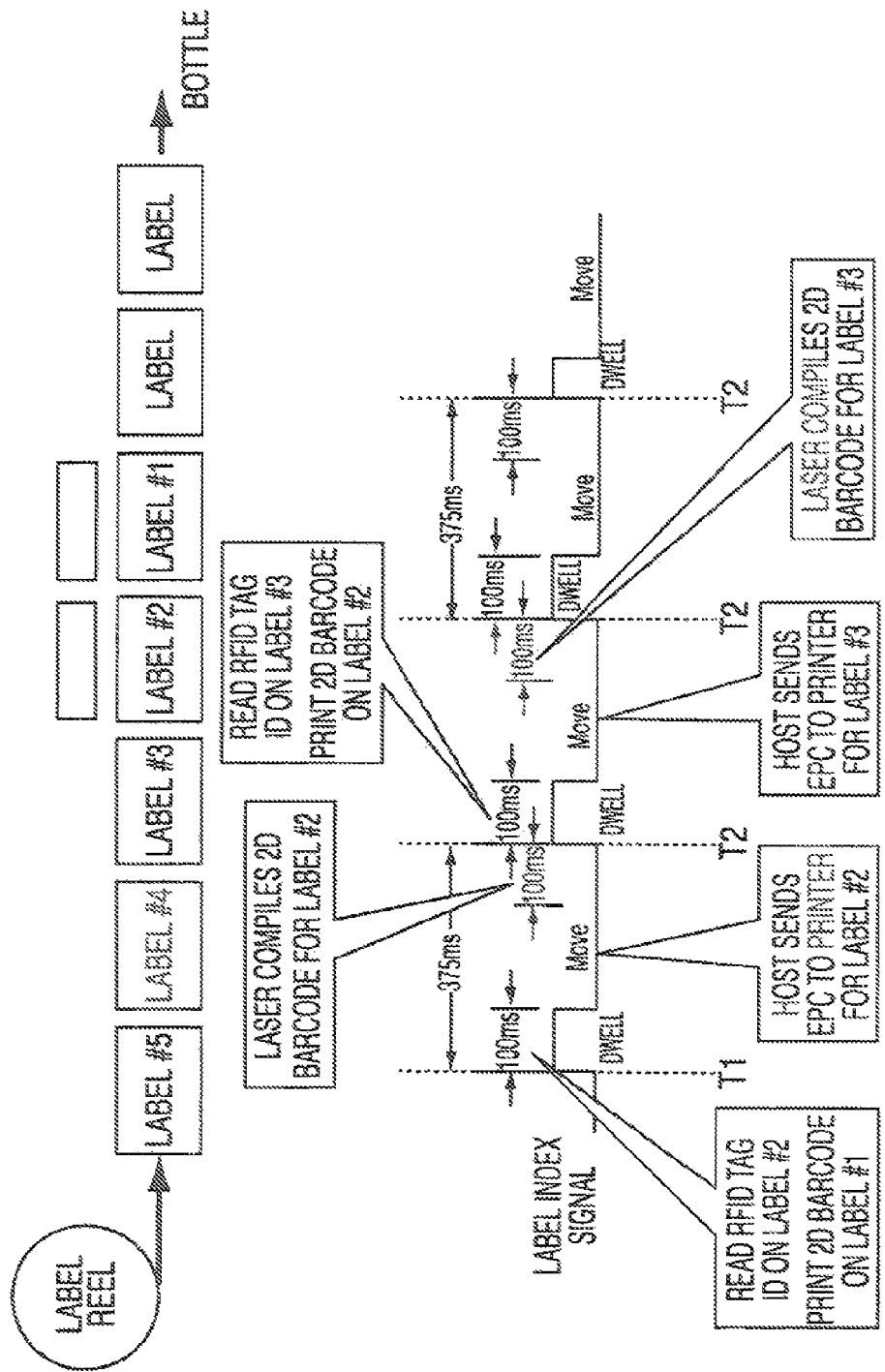
FIG. 3 is an illustration of the aspects of the present invention.
Figure 3A:
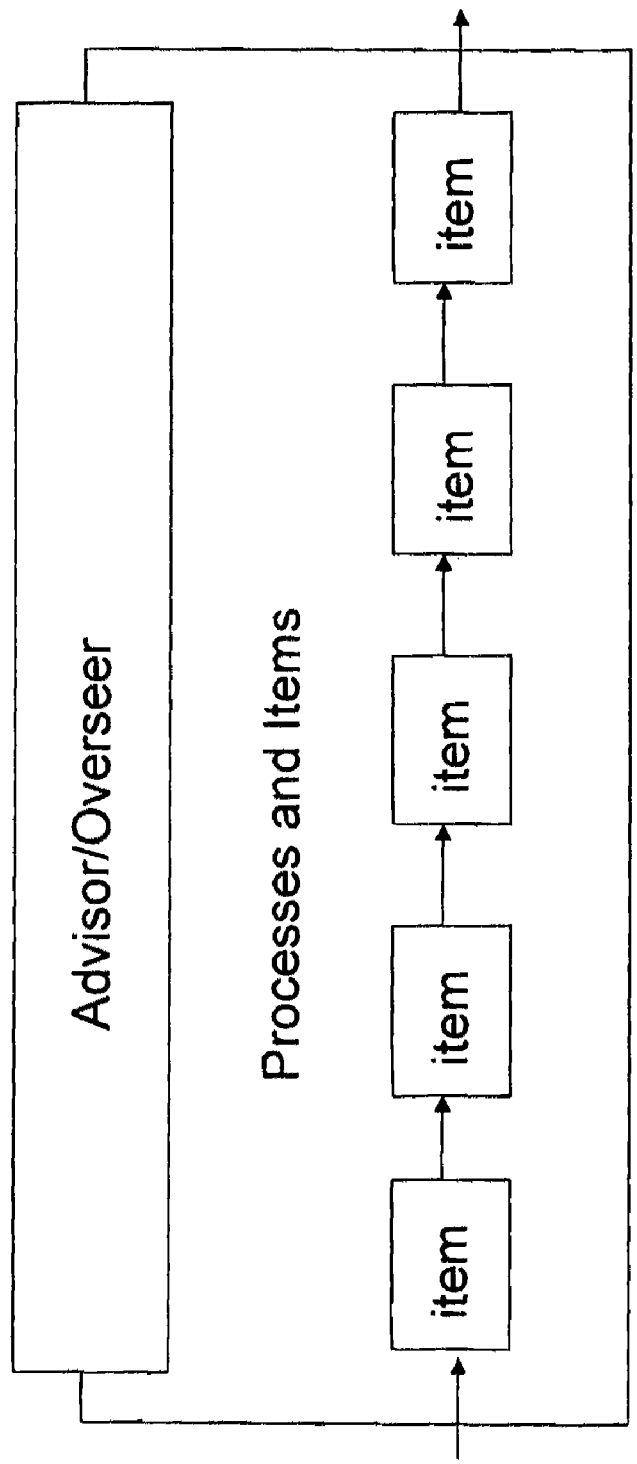
FIG. 3A is an illustration of the aspects of the present invention.

Another exemplary embodiment may include the quality control process over labeling. By utilizing scanning and video devices, the system my pre-qualify a printed label, pre-package application, as to its printed nature and/or its RFID status, for example. In this example, the system must track data matrices of both physical barcodes and RFID signatures. These matrices are repeatedly matched and compared throughout the life of the product and may correspond to the attributes assigned and inherited by the product until its useful life is extinguished. While in the line, as illustrated in FIGS. 3 and 3A, the package may have its label read and compared to the information associated with label. If an error is detected, such as a mis-matched RFID and barcode, or an unreadable product name, as example, the bottle may be rejected and removed from the line.

This granularity allows for one or more result lines to be associated with each process, and thus with each item. The IPS system may maintain a current set of used output lines, and the current state of the output lines for each item, for example. When a process fails an item, the output line(s) associated with the process may be set to a failed state and may fail all of the output lines not used at that point in the stream, for example. Unless another process specifically overrides the current state of the result line, a failure at any point in the stream may fail all of the output lines used by processes later in the stream, for example.

The item-process-stream system of FIG. 1 may be resident, for example, in one or more software modules associated with one or more computing processors, such as may be provided by one or more servers, and associated with one or more inputs/outputs (I/O). As such, the system may provide a graphical user interface (GUI) for interacting with the system, and/or for accessing data, modification, tracking, and/or reporting tools, for example. The GUI may allow for modification to the I/O, which may thereby modify and/or allow for interaction via the GUI with the line. As will be appreciated by those skilled in the art, interaction with the system, such as using the GUI, may be available locally in association with the line, and/or remotely, such as via one or more networks associated with the I/O. Accordingly, the system may provide, such as in conjunction with the GUI, a plurality of platforms (such as for inspection, multi-line integrations, and the like), design and experimental design of one or more lines, and management of one or more lines. The one or more lines may be managed using the GUI, for example, as an enterprise, such as by a single owner, or by a third party line manager managing a variety of enterprises, for example.

Such a GUI may include one or more interface and/or interaction types, such as menus, drop-downs, tree menus, pop-up menus or windows, windows, or the like. For example, the GUI may present a file menu, wherein the one or more available commands may include new (discards current configuration and initializes an empty configuration), open (opens configuration files), append (appends a configuration file to the one currently loaded), revert (discards current configuration and re-loads the current configuration file), save (saves the current configuration), save as (save the current configuration using a new name), update translation cache (updates the local cache of message translations), save translations (saves the current set of registered application messages), and save all translations (loads all of the operations on the system and saves all of the application messages as registered by the operations into a file), for example.

In additional exemplary embodiments of a GUI, a right click pop-up menu may allow the user to connect (connects the selected operations together in the streams), cut (copies the selected operations to the clipboard and deletes them), copy (copies the selected operations to the clipboard), paste (inserts the contents of the clipboard above the currently selected operation), delete (deletes the selection operations), copy value (copies the current data value to the clipboard), edit value (modify the value), reset counts (resets all performance counts, reset timing (resets all the performance timing), reset all (resets all the performance counts and timing, and perform group operations, such as group (create groups of selected operations), cut, copy, paste, delete, lock (toggles the lock state of the group, i.e. when "unlocked", the internal operations and streams are accessible, and ungrouped. Such capabilities may be available globally, or only in certain circumstances, such as when a line is in lot, or out of lot, in an operation or out, in a stream or out of a stream, and the like, for example.

Dialog boxes may additionally be provided, such as in order to allow modification of information or values. For example, FIG. 4 illustrates a dialog box that allows the editing of a property value. As illustrated, such a dialog box may provide information, and make available certain user actions, either to affect the operation of the IPS engine, or to affect the GUI or dialog box, such as in the case of text wrapping.

Based on the discussion herein, those skilled in the art will appreciate that the IPS system may make a variety of user actions, selections, or the like available via the GUI. A plurality of non-limiting, exemplary ones of such actions, and exemplary icons for association therewith to provide ease of use, such as via a toolbar, are provided in FIG. 5. In FIG. 5, the icons to the left of the operation or stream name may indicate the connectivity of the operation or stream to a neighbor on the line above and/or below the operation or stream.

The icons, menus, dialog boxes and the like referenced hereinabove may allow for drag and drop functionality, such as a menu driven drag and drop. For example, the icon-driven aspects of the GUI may allow for menu-driven locating of items, operations, or streams, and dragging of such icons or items into a desired configuration, system, or the like to obtain a desired outcome. Further, as discussed hereinabove, such a configuration may be recommended, in whole or in part, automatically in order to optimize performance, or limit errors, for example.

The system of the present invention advantageously provides numerous capabilities not available in prior systems that are oriented solely to global consistency. For example, in the present invention, reworking at any level in a process, due, in part, to the individual treatment of all items in the system, at all levels. More specifically, a carton of bottles may be readily reworked in the event of damage to a single bottle, due to the unique identification of not only the carton, but of each bottle that went into the carton, and of each item on each bottle, and of each ingredient for each item that went into the bottle. Likewise, a pallet may be readily reworked in the event of damage/error to one carton on the pallet, not only due to the unique identification of each carton on the pallet, but additionally because the enterprise service provided by the IPS system allows for retention of data throughout multiple processes, and through multiple streams, such that information down to the ingredients of each bottle is available even after palletization, and until the pallets leave the system altogether. Thus, the system provides interconnection and networking capability such that all data on all items, processes, and streams is available for gathering, qualification, execution, modification, and the like, throughout the system, including for transfer to other hierarchical oversight software and the like.

FIGS. 3 and 3A are exemplary illustrations of lines in accordance with the present invention. FIGS. 3 and 3A illustrate an exemplary embodiment of, specifically, a packaging line. The line illustrated may be used, for example, to package aspiring tablets, and may include placement of a specific number of tablets and cotton into each bottle, placement of a label, bar code, and/or RF onto each bottle, printing of lot, batch, or similar information onto each bottle, placement of a cap onto each bottle, placement of a safety seal onto each bottle, and placement of each bottle into a carton of 12 bottles. In the illustrated line, it is preferred than an IPS system provide a single control point for each of the aforementioned items and processes, and for the stream of items that pass through each process.

The single control point allows for unique operations from the aspirin tablet level to the pallet level, and allows for unique tracking of attributes of all items at all points. For example, all qualitative information on each unique serial number of each bottle may be tracked, and, in fact, may be tracked down to the tablet level, and tablet raw material level (i.e. attributes of the water used to make the pills). Although there may be 500,000 bottles in a batch on the exemplary line, for example, the serial number is unique on each bottle, and on each carton of bottles, and on each pallet of cartons, and, thus, so are the attributes of each of these items at each level.

Further, in this exemplary line embodiment, the Food and Drug Administration (FDA) in the United States mandates a physical separation between products/doses on a line. As such, a line must be shut down and between each dosage change, such as a change in the aspirin dosage in the exemplary embodiment above. The IPS system allows for a seamless shot down and restart, in part due to the ability to design, manage, and track as a stream. The present invention may also significantly reduce such down times given the modular nature of the system. Specifically, even when a line is stopped or otherwise interrupted, the system continues to track and record so as to allow for quick resumption of the line by, for example, knowing the location and status of each process and/or item.

More specifically, modularization allows for performance of the same process or processes in different ways, quickly and seamlessly. In an exemplary embodiment of the present invention, in the event an RFID label is to be prepared, two options may be available: 1) obtaining a series of RFID labels for placement onto bottles on a line; or 2) using two label webs, one of a data matrix of serial numbers, and one of an RF tag overlay. In the prior art, option 1) is more efficient because less machinery and process development and design is required. However, in the present invention, option 2) may be just as efficient, and much more cost effective, than option 1).

More specifically, the serial number and RF overlay webs, may readily be tracked individual, and may be matched for overlay in a corresponded manner onto each bottle, or the serial label may be placed onto bottle, then later overlayed with the RF tag. Thus, a significant cost savings may occur. For example, a typical RFID label with an associated serial number may cost $0.75 per label. However, the overlay capabilities provided by the IPS system may allow for use of an RF tag label web, at a cost of $0.07 per label, and a serial number label web, at a cost of $0.01 per label. In such an instance, the cost savings would be $0.67 per label.

Further, for example, the IPS system may know the unique attributes of each bottle, and may thus read a tag again before any new label is applied and know on which bottle the application is to occur, or bottles can be counted as is done in the prior art, but with the attributes of each bottle in the count already known to the IPS system. Thereby, as a bottle spins down the line, if the IPS system expects that bottle to be associated with particular attributes, and it is not, the bottle (or any item) may be readily rejected. Such attributes may include, for example, photographic attributes, such as to know what manufacturer's label went onto each bottle on any line. Further, as will be understood to those skilled in the art in light of the disclosure herein, each item gains attributes as it passes through the IPS system.

The IPS system of the present invention may include "plug-and-play" functionality, for example. In such embodiments, items may be automatically detected, and operations and streams may be downloaded, manually or automatically, or may be recommended, such as wherein a certain number or type of items to be subjected to a number of operations has recommended therefore a stream.

Figure 6:
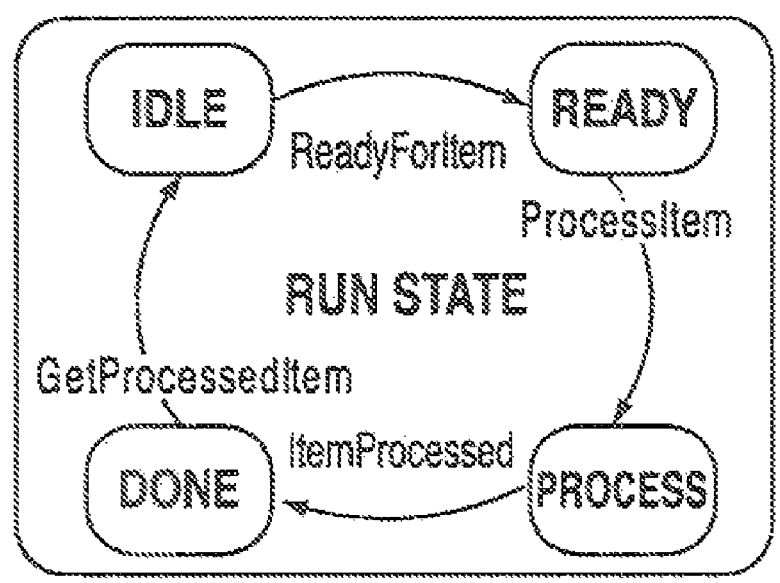
FIG. 6 is an illustration of the aspects of the present invention.

With or without plug-and-play operability, each operation may run in its own thread in the IPS system. The IPS system may feed each operation an item when the operation signals that it is ready to receive an item. Conversely, the IPS system may take items from each operation when the operation signals that the item is available. FIG. 6 illustrates a state diagram of the IPS system interactions discussed hereinabove.

The IPS system may operate in at least two exemplary modes, namely production mode (attached to an actual production line), and simulation mode (models a virtual production line). In such an exemplary embodiment, production mode may be used when physically attached to a line, as discussed above. This allows the system to control, monitor, and collect information about the line in accordance to the active configuration. A simulation mode may be used when the system is not physically attached to the line. Simulations may assist in verification of a process during development, sales demonstrations of capabilities, simulation of "what if" scenarios, prequalification of line process, training of system users, and like activities. Simulation mode may be further sub-divided into categories to indicate the focus of the simulation, such as production mode, device simulation, server simulation, full simulation, and the like. Simulation may allow the system to model the most cost efficient system for the line operator. Similarly, building a new process or function into an existing line may take less than a day and may take no more than a week, while tradition system may take no less than several weeks to design and write customized code to fit the requested need of the line operator.

One feature made possible due to the tracking and controlling discussed hereinabove may be the retention of qualitative information once the packaging process is completed and verified. Such qualitative information may allow for "cradle to grave" tracking of each piece of the manufacturing and packaging process, before, during and after those processes have occurred. For example, information regarding the source and processing of the raw and otherwise processed materials of a product to be packaged may be incorporated into the tracking of the present invention, as discussed above with respect to the source and chemistry of the water used in a given batch of product to be packaged. This package of qualitative information may also be pushed downstream with the product through shipping and distribution to wholesale and retail sale, for example, as discussed above. For example, prior to shipment and at the shipper level, while the package(s) are their responsibility, the qualitative information may allow a unit, such as a pallet of product, to be "reworked" or re-sorted to conform to the needs of an end user. Such information may also be useful if, for example, a loss occurs during the shipping and distribution process, either through replacement, a loss claim and/or meeting reporting requirements.

The downstream push of information may also follow the sellers and users of the packaged products. For example, if a product is discovered defective at the time of actual use, information such as the date of manufacture, lot number and even the source of the raw materials used, may be quickly ascertained and provided to an interested party, such as, for example, a government agency. The information may also be resident with retailers who, upon scanning the barcode of an item, may be able to provide the end consumer with information surrounding the lifecycle of the product. This type of "cradle to grave" tracking may be possible through the serialization of each and every function, process and/or item, allowing data to follow the physical world.

Figure 7:
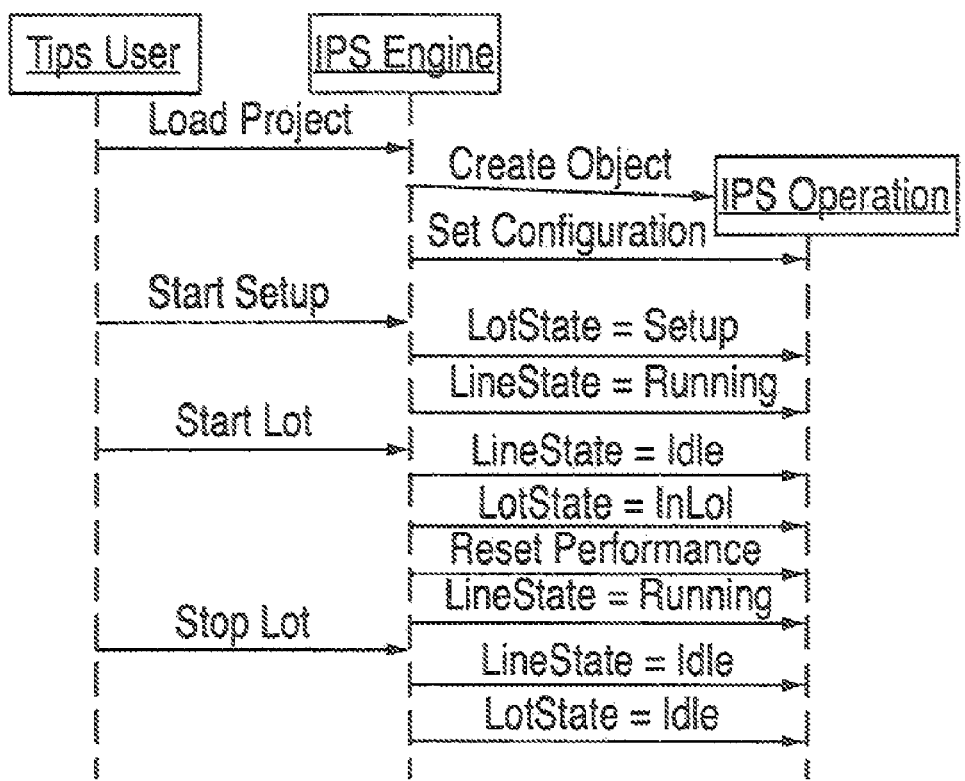
FIG. 7 is an illustration of the aspects of the present invention.
Figure 8:
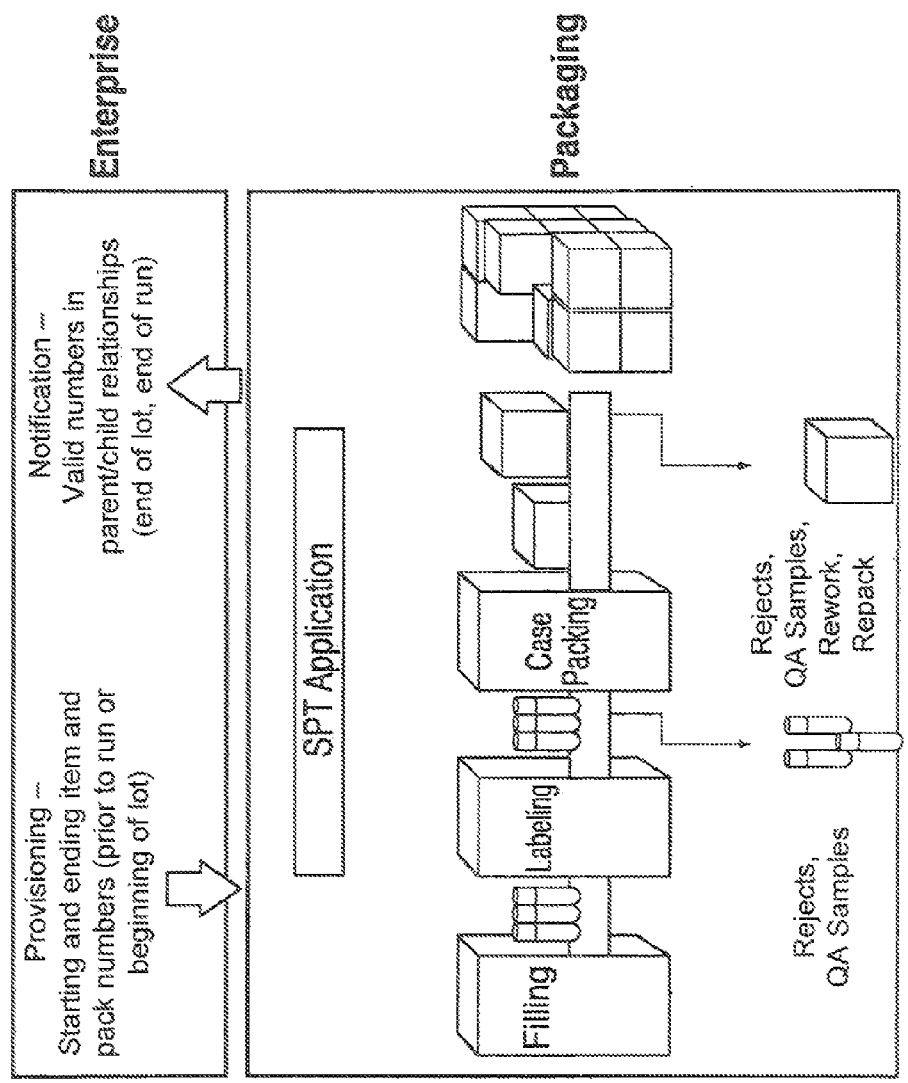
FIG. 8 is an illustration of the aspects of the present invention.

The IPS system may operate in conjunction with, and/or under the direction of, an Advisor/Overseer within a line-based system, as illustrated, for example, in FIG. 7. Referring additionally to FIG. 8, an exemplary embodiment of a typical packing process including an Advisor/Overseer is shown, and as shown may include the flow of product from unit to pallet in a complex, per identified unit packaging environment. From a macro prospective, the Advisor/Overseer application engine may communicate with at least one user interface and/or manufacturing process and at least one packaging system. Such communication provides the data necessary to populate the desired attributes assignable to each of the serialized units. These attributes may be assigned initially through a filing process, and may provide information useful at the unit, bundle, case, and pallet level. For example, a unit may be associated with a unique unit ID, vignette, tamper evident label number (TEL), serial number, and customer number, for example. This assigned information may be tracked by the Advisor/Overseer application and associated with additional identifiers, such as when units are grouped into larger groups such that the end result achieved is either a case or a pallet, for example.

In an embodiment of the present invention, the Advisor/Overseer application pools serial numbers associated with a specific end-user product that may, or may not, be uniformly produced and packaged. A serial number may be requested and assigned by the filing process and communicated back to at least the Advisor/Overseer application. The Advisor/Overseer application may then verify the assignment of the serial number and associate other attributes to the now-serialized unit. As the packing of additional units continues, the Advisor/Overseer application may also aggregate multiple child units into at least one parent group. Parent groupings may be assigned attributes not otherwise associated with child units. For example, parent groupings may have information related to the source of the child units' raw materials, date of inception, manufacturing protocol, pertinent federal law information, and total associated child units, for example.

The parent groups need not be physically packaged together. Instead, parent groups may be packaged in any number of boxes and again grouped in any number of pallets, for example. The Advisor/Overseer application may track and assign identifiers to allow for child and parent association to persist regardless of whether associated units are split between bundles, cases or pallets. Similarly, individual units may be associated with more than one parent. Such an association may be used for quality control purposes, for example.

By pre-pooling serial identifiers prior to assignment and developing groupings and additional associations, the Advisor/Overseer application may expand typical line management and inspection processes to include real-time serialization of products at speeds approaching 300 units per minute, for example.

Of course, in practice, the physical embodiment of the serial identifier may be in the form of a bar code, an RFID tag, or similarly known package identification tool. RFID tags may take the form of single read tag, a single write tag, and/or a multi read or write tag, and/or an active or passive tag. Units may also be affixed with more than one barcode and/or RFID tag, and/or may have some combination of both. For example, in FIG. 3, a process for affixing such identifiers to a unit label is illustrated. As illustrated, the RFID Reader may require a minimum of 100 ms to read the RFID tag and the printers may require a minimum of 100 ms after data download in order to prepare for the next print.

Figure 9:
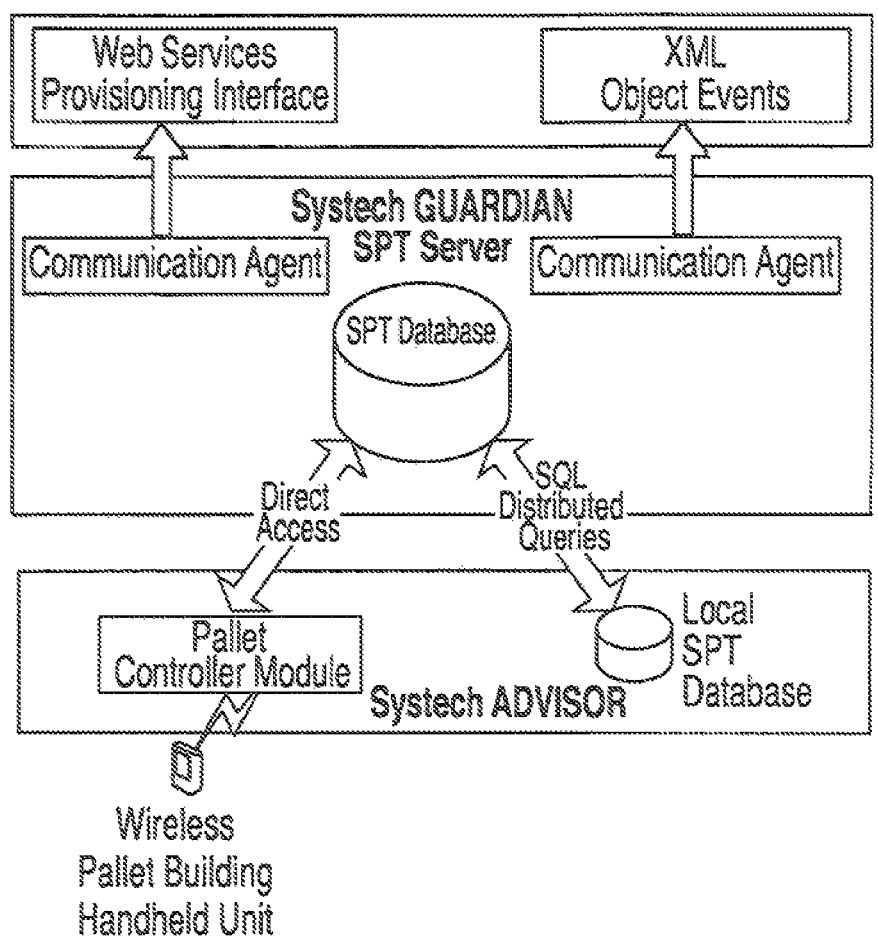
FIG. 9 is an illustration of the aspects of the present invention.

In an exemplary embodiment of the present invention illustrated in FIG. 9, a unified Advisor/Overseer server may provide plant level functionality for management and data collection to support product serialization on multiple packaging lines within a single packaging facility. Packaging line management, as illustrated, may be provided by an individual Advisor/Overseer for each line, for example. Communication between the unified Advisor/Overseer server database and the at least one local Advisor, and the data thereof, may be through SQL distributed queries, for example. This communication may occur periodically, such as at predetermined batch intervals, or continuously, during the packaging process, for example. Thus, Advisor/Overseer data may be temporarily stored in the local Advisor/Overseer database during packaging and periodically transferred up to the unified Advisor/Overseer server. At the end of a packaging lot, all data may be transferred from the local Advisor/Overseer database to at least one unified Advisor/Overseer server database.

The Advisor/Overseer system of the present invention may additionally provide pallet control. A pallet controller module may be used to perform manual pallet operations either during a lot or after a lot has been closed. The pallet controller module may form part of, or be communicatively associated with, the Advisor/Overseer that manages a packaging line, or with a separate Advisor/Overseer that is dedicated to manual pallet operations, for example.

For example, a wireless handheld unit may communicate with a local Advisor/Overseer pallet controller module, and may or may not interact directly with the unified Advisor/Overseer server database. Such a device may allow for information such as packing assemblage, palletizing, shipping, quality assurance, and/or delivery, to be communicated from and to a mobile unit, for example. The unified Advisor/Overseer server and Advisor/Overseer may also communicate with each other, and/or with one or more handheld units, such as for the purpose of tracking and regulating the serialization of various lots and units.

Figure 10:
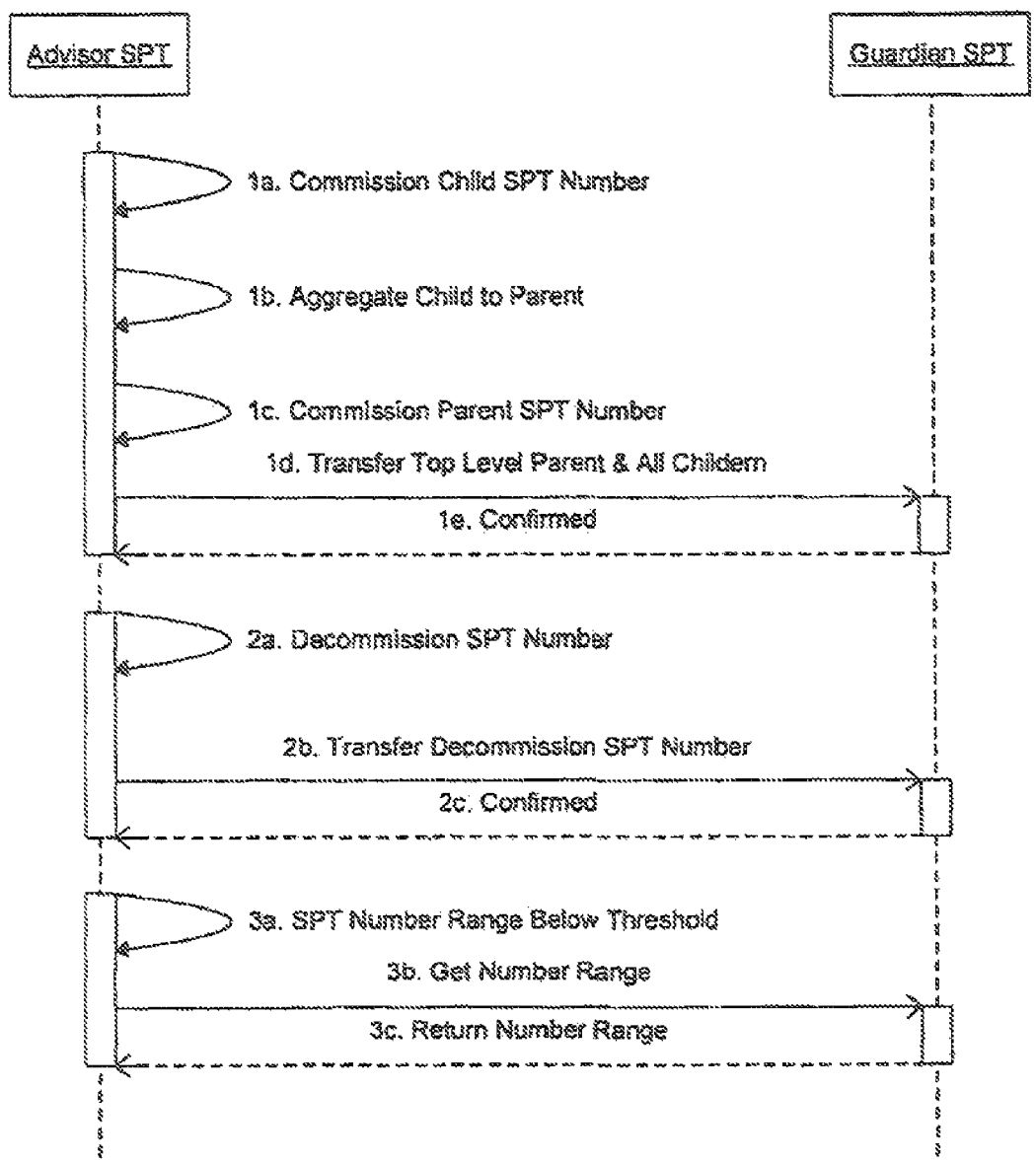
FIG. 10 is an illustration of the aspects of the present invention.

As illustrated in FIG. 10, the Advisor/Overseer may provide an individual serial number to a unit. The Advisor/Overseer may provide packaging line management to allow for, provide for, and/or assign such serialization. Once a packaging object (unit, bundle or case) has been assigned one or more Advisor/Overseer numbers, it may become an Advisor/Overseer item. Once the Advisor/Overseer item has passed all required inspections, it may be commissioned.

In certain exemplary embodiments of the present invention, several inspections may be handled primarily by the Advisor/Overseer before an Advisor/Overseer item actually may be assigned a given status, such as a top level parent. As used herein, a top level parent is defined as the highest parent level in the hierarchy on a packing line. Because of this, the Advisor/Overseer may not transfer every commissioned Advisor/Overseer item to the unified Advisor/Overseer server at the time of commissioning. Additionally, Advisor/Overseer items that are rejected (or fail inspections) from the packaging line may be automatically decommissioned. The identifiers for such decommissioned Advisor/Overseer items may be sent immediately to unified Advisor/Overseer server in order to limit errors, as will be understood by those skilled in the pertinent arts.

As Advisor/Overseer numbers are issued by the unified Advisor/Overseer server to the Advisor, the Advisor/Overseer numbers may be pooled and cached, and any existing serial number range may be checked. If the range drops below a configured threshold value, the Advisor/Overseer will make a request for additional serial numbers to the unified Advisor/Overseer server. If the unified Advisor/Overseer server is not available to fulfill the request, packaging may continue until the Advisor/Overseer has used all available Advisor/Overseer numbers.

Figure 11:
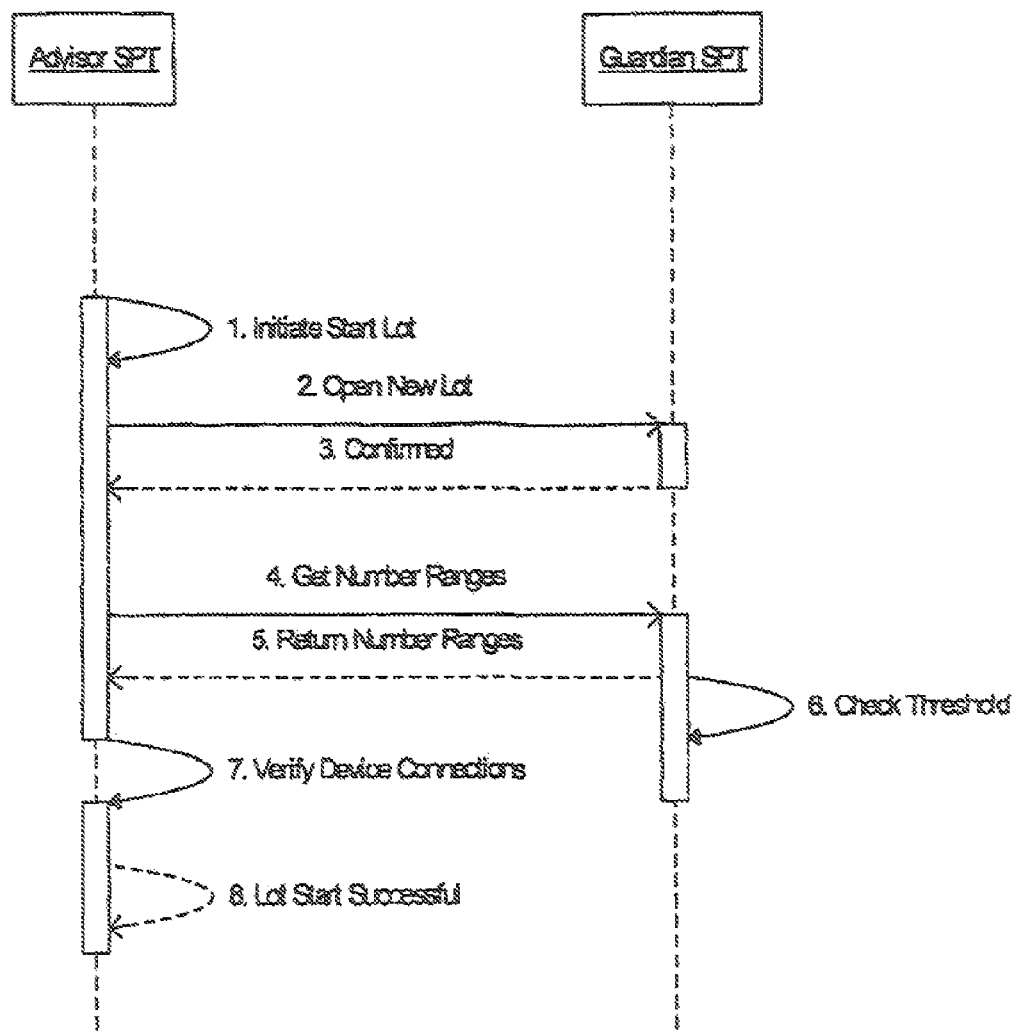
FIG. 11 is an illustration of the aspects of the present invention.

As may be appreciated by one skilled in the art, the assigning of identifiers may coincide with the beginning and ending of a lot, for example. As illustrated in FIG. 11, the (communication between the Advisor/Overseer and the unified Advisor/Overseer server during the start lot process may be handled through SQL distributed queries, for example. Communication between the Advisor/Overseer and unified Advisor/Overseer server may be required to start a specific lot so that the appropriate first identifier and other packaging line specific details may be properly assigned and recorded. As a first step, the Advisor/Overseer may initiate a "start lot" command, that is, the packaging operator may initiate the start lot process from the Advisor/Overseer system by executing a new lot transaction. The unified Advisor/Overseer server may log the assigned lot number and product attribute(s), for example. A transaction verification engine may be used to indicate if the unified Advisor/Overseer server was able to open and verify the new lot. If the new lot was not opened, the operator on the Advisor/Overseer may be notified and the start lot process may be terminated and restarted by the operator after troubleshooting the event. Of course, in embodiments of the present invention, the unified Advisor/Overseer server may provide automated process verifications and corrections to continue processes, such as the opening of lots, without operator interaction.

Once a lot is open, the Advisor/Overseer may execute the transactions to retrieve number ranges based on product configuration. If, for example, pre-encoded product labels are used, a request may not be made for those objects. A successful transaction response may be a range of serial numbers. If serial numbers are not made available by the unified Advisor/Overseer server, then the start lot process may terminate. The remaining number range may be verified, and an automatic provisioning request may issue if the range is below the predetermined threshold. The Advisor/Overseer may then download setup information, which may be distributed to configured devices associated and/or designated to operate with the current run. Any device communication errors may be reported to the Advisor/Overseer and/or the unified Advisor/Overseer server. Such reporting may be initiated by the device and/or the operator and may allow for the termination of the start lot process.

Once the system has completed a first verification process, and the unified Advisor/Overseer server has returned the assigned number ranges, the release of the lot associated numbers may occur to signal that the start lot process was successful and to allow the associated production process to begin.

Figure 12:
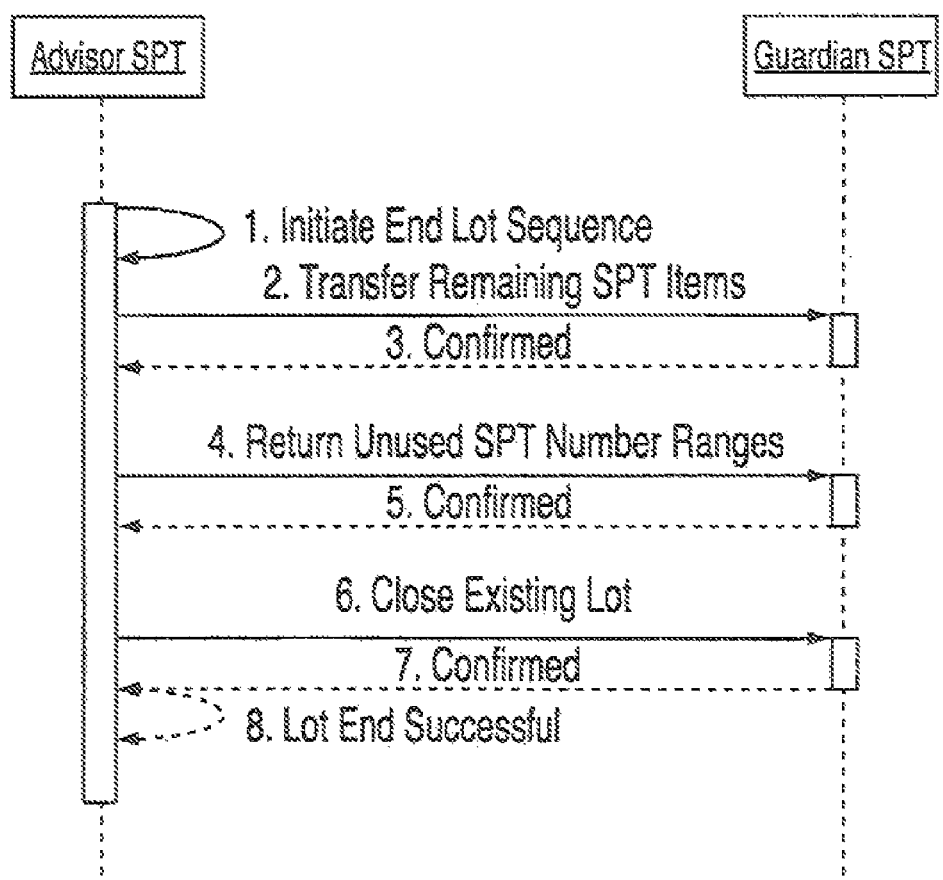
FIG. 12 is an illustration of the aspects of the present invention.

Once a lot has been open and run, the lot may be closed. In an embodiment of the present invention, as illustrated in FIG. 12, the communication between the Advisor/Overseer and the unified Advisor/Overseer server during the end lot process may be required to end the lot. For example, an operator of the Advisor/Overseer may initiate an end lot process. When the lot process is stopped prior to the use of all the available numbers for the run, the Advisor/Overseer may execute at least one transaction to transfer all remaining Advisor/Overseer items to the unified Advisor/Overseer server. A transaction return may indicate that all data was transferred successfully. If the transfer was not successful, the operator of the Advisor/Overseer system may be notified and the end lot process may not be complete.

After a successful end lot process, the Advisor/Overseer may execute transaction to return all unused Advisor/Overseer number ranges to the unified Advisor/Overseer server. Although, if pre-encoded labels are being used, then a return of unused Advisor/Overseer number ranges to the unified Advisor/Overseer server may not be necessary. A transaction return may signal that all data was transferred successfully. An unsuccessful transfer may be brought to the attention of the operator of the Advisor/Overseer and the end lot process may again be terminated. As mentioned above, the unified Advisor/Overseer server may automatically terminate such a process based on a negative report produced by a transaction verification. As may be expected, a successful end lot process may mark the successful end of a production.

In an embodiment of the present invention, an aspect, such as a performance enhancement engine, may be provided for the collection and maintenance of system criteria and attributes for both local and remote system activities. The performance enhancement engine may track and store information related to lot attributes, process run attributes and production rate information. The performance enhancement engine may also track and store information related to the process type, including the priority and/or ran of the process run, the quality of a given process run and any errors or associated validation information, and statistics, such as, for example, the number of units processed in a given run, the number of "passed" and "failed" units associations and/or quality verifications, total rejected items, process interval times, including both per unit and per run times, and efficiency information, including the time necessary to resolve process stoppages, for example.

An embodiment of the present invention is illustrated in FIG. 3A. An example portion of production line 750 may be under the control of the Advisor/Overseer and other aspects under the further control of the unified Advisor/Overseer server.

As further illustrated in FIG. 3, labeling unit 714 may perform a variety of functions. The labeling unit 714 may receive input related to the serialization number and other label attributes and print the unit label(s). It may also include visual inspection capabilities for the verification of label attributes, such as, for example, unit number, date, lot code, and expiration date. Any negative and/or failed verifications may allow for a label to then be pulled from the labeling process and rejected. A verified label may then be placed on the subject unit. The verification of the label information may be evaluated on a strict match basis or may have the flexibility of a range or threshold. The labeling and verification process associated therewith may be performed in a first in, first out manner. Such a configuration may enhance the ability of the system to properly label and verify the units entered into the process.

The generation of the serial numbers that may be used by the present invention may be randomly generated. In an embodiment of the present invention, a random number generator, such as a software engine, may be used to generate random numbers that are suitable for use as serial numbers. Such an engine may generate numbers using one of several pre-defined formats, such as 20 digit VL, 20 digit SN, 16 digit SN, 12 digit SN, or custom, as detailed further hereinbelow.

The generated number may be stored as a data value for association with an in process item, such as an item-process-stream ("IPS") item as discussed further hereinbelow. More specifically, each IPS item may be represented by a plurality of data assigned to that item in the Advisor/Overseer database, such as for use by the Advisor. Such data may include, for example, the item name, item type, assigned random serial number, characteristics, batches, lots, verifications, commissions, hierarchical locations, success or failure, or the like. The engine can also be configured with a format expression to construct an Advisor/Overseer compatible number from the generated serial number. The formatted number may also be stored as a data value on an IPS item.

The disclosure herein is directed to the variations and modifications of the elements and methods of the invention disclosed that will be apparent to those skilled in the art in light of the disclosure herein. Thus, it is intended that the present invention covers the modifications and variations of this invention, provided those modifications and variations come within the scope of the appended claims and the equivalents thereof.

What is claimed is:

1. A production line management system, comprising:
   at least one computing processor and at least one memory;
   at least one data item stored in the memory, the data item representative of a particular material item passing through a production line;
   at least one segment of computing code stored in the memory, representative of an operation using the data item, as a process type module;
   at least one instance of the process type module which, when executed on the computing processor, causes the operation to be performed using the data item, representative of an action performed on the corresponding material item, as a process; and
   at least one combination of more than one process as a stream, representative of at least a portion of a production line through which the material item passes.

2. The line management system of claim 1, further comprising a graphical user interface enabling a user to form the stream from select processes.

3. The line management system of claim 2, wherein the graphical user interface enables a user to store the stream in the memory and retrieve the stream from the memory.

4. The line management system of claim 3, wherein at least one stream is exchanged for at least one other stream to adapt the production line to a change in the production line's operational goals.

5. The line management system of claim 2, wherein the graphical user interface enables a user to modify the stream.

6. The line management system of claim 5, wherein the stream is modified to adapt the stream to a change in the production line's operational goals.

7. The line management system of claim 1, further comprising an advisement module for tracking particular ones of the data items through the stream.

8. The line management system of claim 1, further comprising a graphical user interface enabling a user to modify at least one of the data item, the module, the process, and the stream.

9. The line management system of claim 1, wherein the material item is one of a tablet, a bottle, a label, a bundle, a case, and a pallet.

10. The line management system of claim 1, wherein the data item includes information representative of at least one of a weight, a temperature, a quality, and a serial number of the material item.

11. The line management system of claim 1, wherein the stream is storable in and retrievable from the memory.

12. The line management system of claim 1, further comprising at least one operations module for the tracking or line machine performance data, wherein the machine performance data includes at least one of an amount at physical wear, a rate of wear, compliance with line operation rules, and proper functionality.

13. The line management system of claim 1, wherein at least one of the processes and streams has a corresponding type for verifying that it is compatible with the production line's operational goals.

14. The line management system of claim 1, wherein, in operation, at least one of the processes signals it is ready to receive a new data item; and after performing the operation using the data item, signals it is ready to send the data item.

15. The line management system of claim 1, wherein the stream models at least a portion of a physical production line.

16. The line management system of claim 1, further comprising:
   the at least a portion of a physical production line; and
   a data network coupling the processor on which the stream executes to the portion of the production line;
   whereby the stream, when executed on the computing processor, causes the actions to be performed on the material items that correspond to the data items operated on by the processes of the stream.

* * * * *